United States Patent
Tong et al.

(10) Patent No.: US 8,111,143 B2
(45) Date of Patent: Feb. 7, 2012

(54) ASSEMBLY FOR MONITORING AN ENVIRONMENT

(75) Inventors: William Tong, San Francisco, CA (US); Geoffrey Lyon, Menlo Park, CA (US); Philip Kuekes, Menlo Park, CA (US); Zhiyong Li, Palo Alto, CA (US); Shih-Yuan Wang, Palo Alto, CA (US); R. Stanley Williams, Portolla Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1757 days.

(21) Appl. No.: 11/117,976

(22) Filed: Apr. 29, 2005

(65) Prior Publication Data

US 2006/0244568 A1 Nov. 2, 2006

(51) Int. Cl.
*H04Q 5/22* (2006.01)

(52) U.S. Cl. ............... 340/10.51; 340/1.1; 340/572.1
(58) Field of Classification Search ............ 340/825, 340/10.1, 10.2, 10.3, 10.31, 10.32, 10.33, 340/10.34, 10.4, 10.41, 10.5, 10.51, 10.52, 340/572.1, 572.2, 5.61, 5.64
See application file for complete search history.

(56) References Cited

U.S. PATENT DOCUMENTS

| 6,720,866 | B1 * | 4/2004 | Sorrells et al. ............... 340/10.4 |
| 2004/0036595 | A1 * | 2/2004 | Kenny et al. ............... 340/505 |
| 2004/0233043 | A1 * | 11/2004 | Yazawa et al. ............... 340/10.3 |
| 2006/0208879 | A1 * | 9/2006 | Bratkovski ............... 340/539.26 |

* cited by examiner

*Primary Examiner* — Nabil Syed

(57) ABSTRACT

An assembly for monitoring an environment includes a RFID tag and a sensing unit. The sensing unit is configured to be activated by a RF signal received by the RFID tag and to sense information regarding an environment.

20 Claims, 7 Drawing Sheets

ASSEMBLY FOR MONITORING AN ENVIRONMENT

BACKGROUND

When a breach or other detrimental change occurs, the detrimental change may need to be corrected immediately. In many cases, correction is required because further damage may arise if the detrimental change is not rectified.

As a simple example, if an automobile drives over a nail, one of the automobile's tires may become punctured. If the tire is not repaired or replaced, the driver may experience problems in steering and/or braking. In addition, if the automobile is driven at normal speeds, the wheel may become damaged. Determining that there is a problem with the tire may not be difficult for an experienced driver because the experienced driver may notice a problem based on a change in the feel of the automobile. The driver may also determine that the tire is damaged through a visual inspection. In other instances, the driver may be notified of the damage by other people who have seen the damage. Another example may include either instant damage or developing damage to a flying craft.

It is not always possible, however, to detect or visually inspect an environment in which damage has occurred. For example, the environment may be in a remote location that is not easily visualized, such as, in the skin of a flying craft or space vehicle. In this example, the occupants of the vehicle may be unaware of the damage because they would likely be unable to detect or visually inspect the damage.

Sensors may be placed in these hard-to-reach areas to detect and report environmental changes. However, these sensors typically require a power supply to perform a measurement. If a power supply fails then the power supply must be changed. However, it may be very expensive or in some situations, such as a situation involving a sensor used on a space craft, very difficult to replace the power supply. Furthermore, the installation, including wiring of the sensors, is typically difficult and expensive, and the ongoing maintenance is also expensive. Furthermore, these sensor systems add additional weight to the vehicles or devices using the sensor systems.

SUMMARY

An assembly for monitoring an environment is disclosed herein. The assembly includes a RFID tag and a sensing unit. The sensing unit is configured to be activated by a RF signal received by the RFID tag and to sense information regarding an environment.

A method of monitoring an environment is also disclosed. In the method, information regarding an event in an environment is sensed using a sensing unit. The sensing unit is activated using a RF signal.

A system for monitoring an environment includes means for sensing information regarding an event in an environment. The system also includes means for activating the means for sensing using a radio frequency signal.

BRIEF DESCRIPTION OF THE DRAWINGS

Features of the present embodiments will become apparent to those skilled in the art from the following description with reference to the figures, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A method and system for monitoring an environment is described. A plurality of radio frequency identification ("RFID") assemblies is dispersed in an environment to monitor and sense changes, such as, for instance, breaches or damage, to the environment in which the RFID assemblies are dispersed.

The RFID assemblies may include a RFID tag including a unique identification ("ID") code to identify the tag. RFID tags are typically programmed with unique identification codes that identify the tag or an object associated with the tag. RFID tags use radio frequency technology to transmit information stored in the RFID tags. For example, a RFID tag may include an integrated circuit and an antenna. The RFID tag may include a passive RFID tag (not using an internal power source such as a battery) or an active RFID tag (using an internal power source, such as a battery) may be used.

The RFID assemblies may each also include at least one sensor to sense information, such as, changes regarding the environment. The sensors may be configured to sense temperature, vibration, stress, or any other information that may be desired.

A RFID reader may be used to activate the sensors in the RFID assemblies. The RFID reader may be configured to interrogate, and thus, activate specific sensors by using its associated RFID tag's unique ID as an address. The RFID reader may also be configured to program the sensors. For example, the RFID reader may be configured to adjust the sensitivity of the sensor to make the sensor less sensitive, and thus save more power. The RFID reader may also be configured to charge a battery that is supplying power to a sensor. In one embodiment, the sensors may not have batteries, and the RFID reader generating a magnetic field to interrogate a RFID assembly is used to induce a current in the RFID assembly to power the RFID tag and the sensor.

Each of the addressed sensors may return a signal to the RFID reader, where the signal includes information sensed by the sensor. The RFID reader may provide the sensed information to a processing system along with other information regarding the RFID assemblies, such as, the unique ID.

Through implementation of the method and system for monitoring an environment disclosed herein, various environments may be monitored, even in situations where changes in the environment are not readily detectable.

Figure 1:
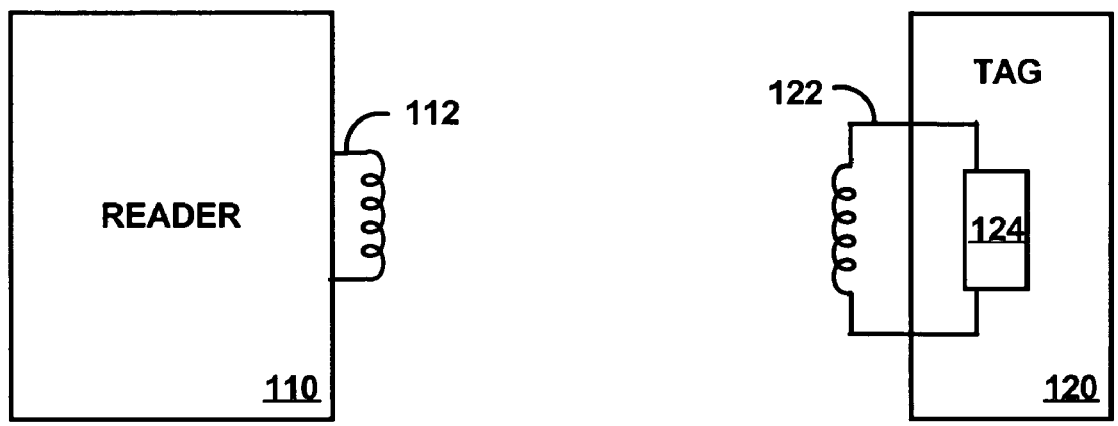
FIG. 1 illustrates an RFID tag and reader.

As shown in FIG. 1, a reader 110 may read a RFID tag 120. The RFID tag 120 and reader 110 may be used in the embodiments described. A reader 110 may include an inductive element as the antenna 112, generating a magnetic field that energizes a tag 120. The inductive element 112 may be part of an antenna. The magnetic field induces an energizing signal for powering the tag 120 via the antenna. The RFID tag 120 may include an inductive element 122 and tag electronics 124. When the tag 120 is in proximity of the reader 110, the magnetic field generated by the reader 110 energizes the tag 120 by inducing a voltage across the inductive element 122 and providing power to the tag electronics 124. At relatively low frequencies of operation (kHz) the reader-to-tag energy coupling method is predominantly inductive as described. At higher operating frequencies (GHz), the antenna becomes RF radiating and the reader-to-tag coupling becomes predominantly electromagnetic. Information in the tag 120 is sent back to the reader 110 using the tag electronics 124 and the inductive element 122 by alternating the loading of the inductive element 122 in a pattern corresponding to the data being sent to the reader 110. This technique is known as load modulation.

FIG. 1 illustrates a passive RFID tag using load modulation. Other types of passive tag technology may be used. Also, instead of a passive tag, an active RFID tag with a power source, such as a battery, may be used.

Figure 2:
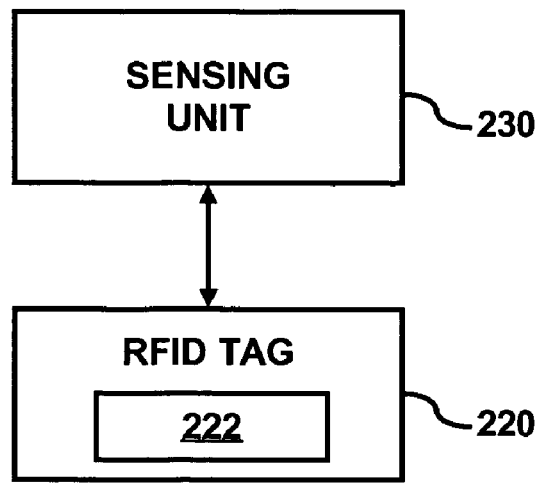
FIG. 2 illustrates an example of a RFID assembly that may be used to monitor an environment.

FIG. 2 illustrates a RFID assembly 200, which may be used to monitor an environment. As shown in FIG. 2, the RFID assembly 200 includes a RFID tag 220 and a sensing unit 230. The RFID tag 220 may include the RFID tag 120 shown in FIG. 1 or other known types of RFID tags. The RFID tag 220 may include a passive RFID tag (which does not require an internal power source, such as, a battery) or an active RFID tag (which does require an internal power source).

An RFID reader, such as the RFID reader 110 shown in FIG. 1, is used to send an RF signal, which includes a magnetic field, for activating the RFID assembly 200, which includes activating the sensing unit 230. For example, the magnetic field generated by the reader 110 induces an energizing signal for powering the RFID tag 220 when the tag 220 is in proximity of the RFID reader 110. The RFID tag 220 may then transmit information back to the RFID reader 110, such as information sensed by the sensing unit 230.

The RFID tag 220 may include tag electronics 222, such as a comparator, to determine if a signal received in a particular RFID tag 220 is addressed to the RFID tag 220. For example, a RFID reader 110 may transmit a RF signal including addresses of five different RFID tags. If the signal is transmitted to an area including twenty RFID tags, each tag will compare the five addresses received to a unique identification ("unique ID") stored in the tag electronics. If any of the addresses match the unique ID, the RFID tag 220 may allow the RF signal to be passed on to the sensing unit 230. RFID tags that can be addressed are referred to herein as specified RFID tags.

The sensing unit 230 may be configured to sense information regarding an environment in which it is placed. The changes may include changes in physical attributes, chemical attributes, and/or optical attributes, and the like. In operation, the sensing unit 230 is configured to transmit the sensed changes as electrical signals to the RFID reader 110. In one embodiment, the sensing unit may transmit information to the RFID tag 220, which may be read by the RFID reader 110.

The sensing unit 230 may include any type of sensor appropriate to the environment(s) in which it is to be placed. In one embodiment, the sensing unit 230 may include only a sensor or only multiple sensors. In another embodiment, the sensing unit 230 may include a sensor and a battery, as shown in FIG. 3B, to power the sensor. In some instances, the RFID assembly 200 may include both types of sensing units, such as a sensing unit including a battery and sensing units not including a battery. In some instances, a battery from a first sensing unit may be used to power one or more other sensing units that are part of the same RFID assembly 200. In some instances, the same RFID assembly 200 may be designed to be appropriate for many different environments. In other instances, the RFID assembly 200 may be configured to more specific types of environments. The various environments in which the RFID assembly 200 may be placed include outdoor areas, such as fields, nuclear reactors, automobiles, vehicles, including space vehicles, parts of vehicles, such as tires or engines, mechanical or electrical equipment, wearable garments, animal skins, etc. The RFID assembly 200 may be placed in any area of the environment including various surfaces within or on the environment, such as, the outer skins of vehicles, for example. Thus, the environment may include a surface or a multi-dimensional space, such as a multi-layered surface or field or interior of a container or building.

The sensing unit 230 may sense changes to physical attributes (including mechanical, optical attributes, etc) chemical attributes, biological attributes and the like. In addition, although a single sensing unit 230 has been illustrated in FIG. 2, any reasonably suitable number of sensing units may be included in the RFID assembly 200 without departing from a scope of the RFID assembly 200. In this regard, a single RFID assembly 200 may be capable of sensing changes in more than one type of attribute.

It should be readily apparent that the RFID assembly 200 depicted in FIG. 2 represents a generalized illustration and that other elements may be added or existing elements may be removed or modified without departing from a scope of the RFID assembly 200. For example, the RFID assembly 200 may include more than one sensing unit 230 or more than one type of sensing unit 230 may. Thus, the RFID assembly 200 should thus not be construed as being limited to the sensing unit 230 and RFID tag 220 depicted in FIG. 2.

Figure 3A:
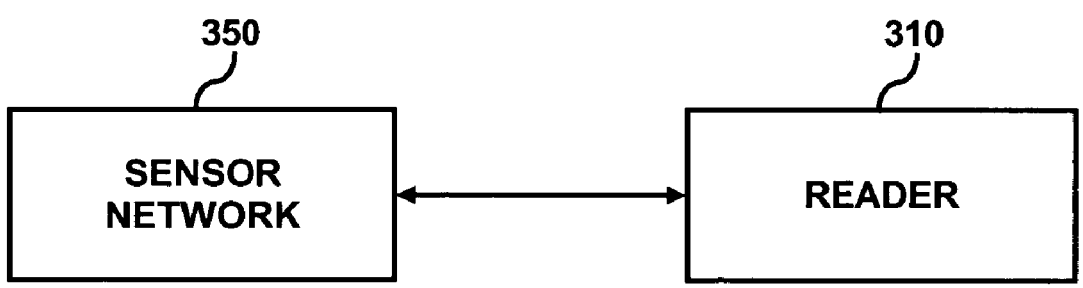
FIGS. 3A, 3B and 3C illustrate examples of environment monitoring systems.
Figure 3B:
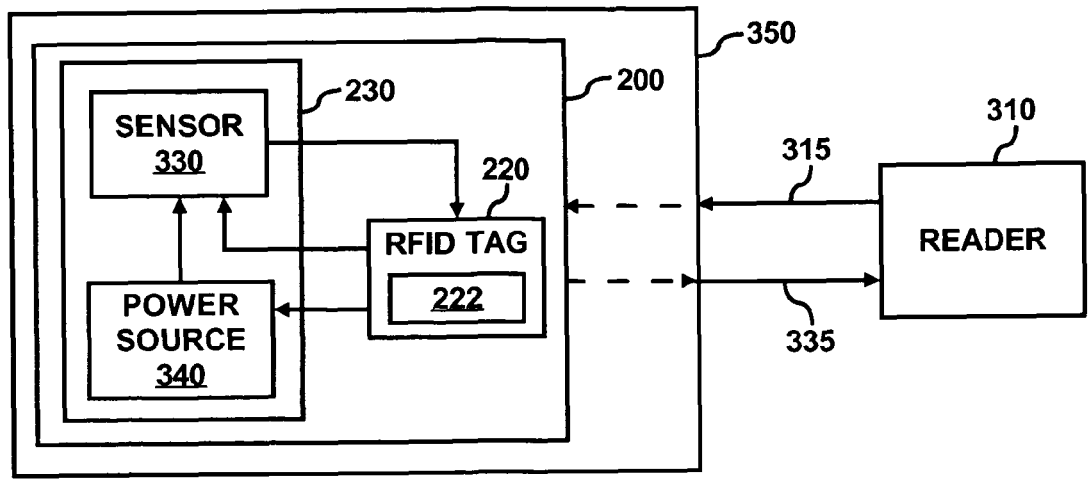

FIG. 3A is a block diagram illustrating an example of an environment monitoring system 300. The environment monitoring system 300 includes a sensor network 350 and a reader 310. The sensor network 350 may include a plurality of RFID assemblies. An RFID assembly in the sensor network 350 may include the RFID assembly 200.

The reader 310 may include a RFID reader or any other reader that may provide a radio frequency signal. The reader 310 may activate one or more sensing units in the RFID assemblies of the sensor network 350. It will be understood that the term activate, as used in this application, may refer to turning on a sensing unit 230, powering the sensing unit 230 or recharging a battery of the sensing unit 230. The reader 310 may activate specific sensors 230 by transmitting a RF signal including unique IDs to address the specific sensors 230 associated with the unique IDs. The reader 310 may also turn off specific sensors by transmitting a RF signal including unique IDs to address the specific sensors 230.

The sensor units 230 in the sensor network 350 may sense attributes associated with the environment or sense a specific event. An event may include any type of change or other occurrence in the environment. For example, an event may include an impact of a rock hitting a vehicle skin. The types of attributes that a sensing unit 230 may monitor may include stress, vibrations, temperature, chemicals in the environment, etc. For example, certain chemicals are detected by swelling of a particular polymer absorbing one of these types of chemicals from the environment. In one embodiment, the RFID assembly 200 may include a transducer to convert the sensed attribute to an electrical signal.

The signals reflecting the change to the environment may be amplified by the tag electronics 222 of the RFID tag 220 shown in FIG. 2 before being transmitted to the reader 310. In addition or alternatively, constant monitoring may be performed using low power sources, such as, ultra-low power durable thin film batteries or other power sources suitable for use with the RFID assembly 200 described.

FIG. 3B illustrates an example of the operation of an environment monitoring system where a sensing unit includes a power source 340. The reader 310 transmits a RF signal 315 to the sensor network 350, which includes the RFID assembly 200. Although not shown, a plurality of RFID assemblies may be included in the sensor network 350.

The RFID assembly 200 receives the RF signal 315 in the RFID tag 220, through, for example, the tag electronics 222. The tag electronics may include an antenna or a coil and other electronics for receiving and transmitting signals.

The RF signal may include addresses for specific RFID assemblies in the sensor network 350 or may not include addresses. If no addresses are provided, then any RFID assembly in range or proximity to the reader 110 receives the RF signal. If the RF signal includes addresses of particular RFID assemblies, a comparator in the RFID tag electronics 222 may determine if any of the addresses encoded in the RF signal matches the unique ID stored in the RFID tag 220. If any of the addresses match the stored unique ID or if no addresses are used, then the RF signal is used to activate the sensing unit 230. The RF signal may activate the sensing unit 230. In this embodiment, activating the sensing unit 230 may include turning on a sensor 330 in the sensing unit 230 or recharging a power source 340 in the sensing unit 230. If none of the addresses encoded in the RF signal match the stored unique ID, the sensing unit 230 is not activated.

The RF signal may also include information with which to program the sensing unit 230. For example, the sensing unit 230 may be programmed to sense a particular type of information or sense with a particular sensitivity. The RFID tag 220 may provide the programming instructions to the sensor 330.

The sensor 330 may sense information from the environment, such as attributes, as described above with respect to FIG. 3A, and provide the sensed information to the RFID tag 220. The RFID tag 220 may transmit the sensed information 335 to the reader 310.

Figure 3C:
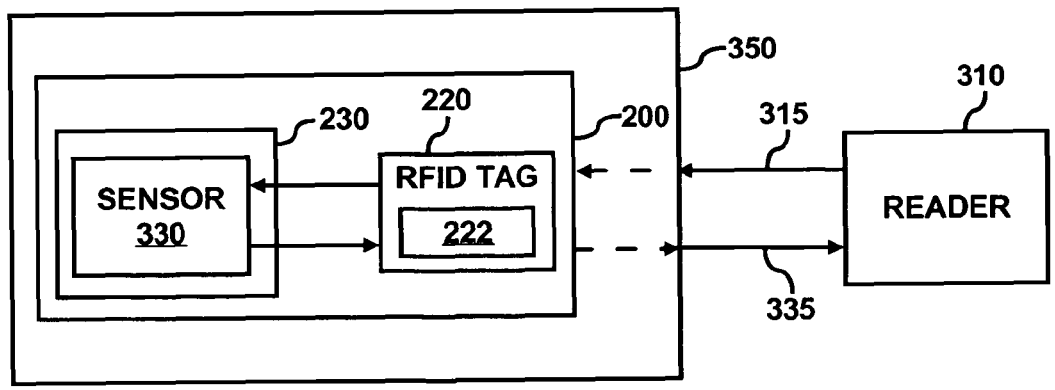

FIG. 3C illustrates an example of the operation of an environment monitoring system where the sensing unit 230 does not include a power source. The reader 310 transmits a RF signal 315 to the sensor network 350, which includes the RFID assembly 200.

If the RF signal is a general signal to all RFID assemblies, the RF signal is provided to the sensing unit 230. If the RF signal includes addresses of particular RFID assemblies, the RFID tag electronics 222 may determine if any of the addresses encoded in the RF signal matches the unique ID stored in the RFID tag 220. If any of the addresses match the stored unique ID, the RF signal is used to activate the sensing unit 230. If none of the addresses encoded in the RF signal match the stored unique ID, the sensing unit 230 is not activated. In this embodiment, the sensing unit 230 does not include a power source. Activation of the sensing unit 230 may include supplying power to the sensor 330 and turning on the sensor 330. Supplying power may include converting the RF signal to a current and supplying the current to the sensor 330. The sensed information 335 is transmitted to the reader 310 via the RFID tag 220. The sensor 330 may include a nanoscale sensor or other type of sensor that uses low power such that the RF signal 315 may be used to generate sufficient power to power the sensor 330.

Figure 4A:
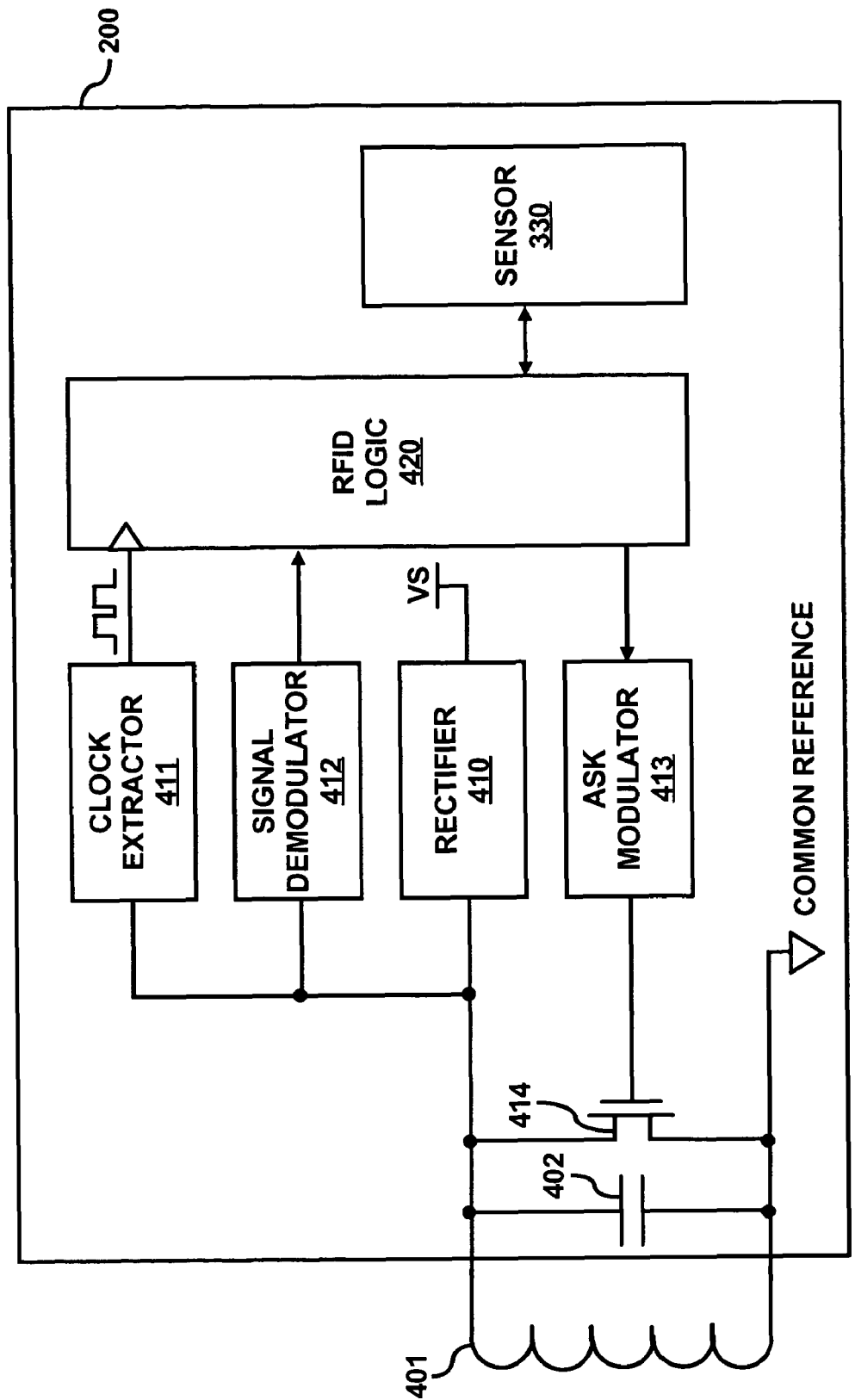
FIGS. 4A and 4B illustrate examples of circuits that maybe used in an RFID assembly.

FIG. 4A illustrates a circuit diagram of an embodiment of a passive tag circuit, not including a power source, which may be used in the embodiment of the RFID assembly 200 described with respect to FIG. 3C. The inductive element 401 and capacitor 402 form a frequency tuned antenna structure that receives power from an appropriate RF field provided by the reader 310. The tag electronics performs a number of functions. A rectifier 410 converts the received RF energy into a supply signal VS, which powers the subsequent tag circuitry, including the sensor 330 and RFID logic 420. More than one sensor may be used and be powered by VS. A clock extractor 411 generates a clock signal to drive the RFID logic 420. A signal demodulator 412 extracts command information from the RF field generated by the reader 310, which is also fed into the RFID logic 420. The command information may include an address and/or programming instructions for programming the sensor 330. An ASK modulator 413 drives a switch 414 placed across the antenna circuit. This provides load modulation of the tags antenna, allowing tag data to flow back to the reader 310. The tag data may include information sensed by the sensor 330. In the implementation shown, VS supplies power to both the RFID logic 420 and the sensor 330. Whenever the RFID assembly 200 receives sufficient external energy, together with an appropriate command (e.g., an address of the tag), from the reader 310, the RFID logic 420 activates the sensor 330, encodes information from the sensor 330 and the information is modulated back to the reader 310.

The RFID logic 420 performs digital circuit functions required to operate the RFID assembly 200. In a minimal (ID only) example, the logic 420 includes a hard coded identifier (e.g., a 64 bit binary number) and a finite state machine (FSM) not shown. The FSM is driven by the clock derived from the RF field and clocks out the identifier to the ASK modulator 413. A more complex FSM can decode incoming commands from the reader 310 and are useful in multi-tag read situations for collision avoidance. In many cases the RFID logic 420 includes read-write identifiers and/or memory blocks, so that the RFID assembly 200 may modify its identity and/or store additional user data. The sensor 330, via appropriate interfacing circuitry, connects to the RFID logic 420 to allow sensor values to be sent to the ASK modulator 413. This could be achieved by digitizing the sensor value(s) and appending the resultant data to the sensing unit identity, such as a tag ID. The FSM clocks out the tag ID followed by the sensor value(s), optionally followed by an error checking code, such as a CRC, also generated by the FSM.

Figure 4B:
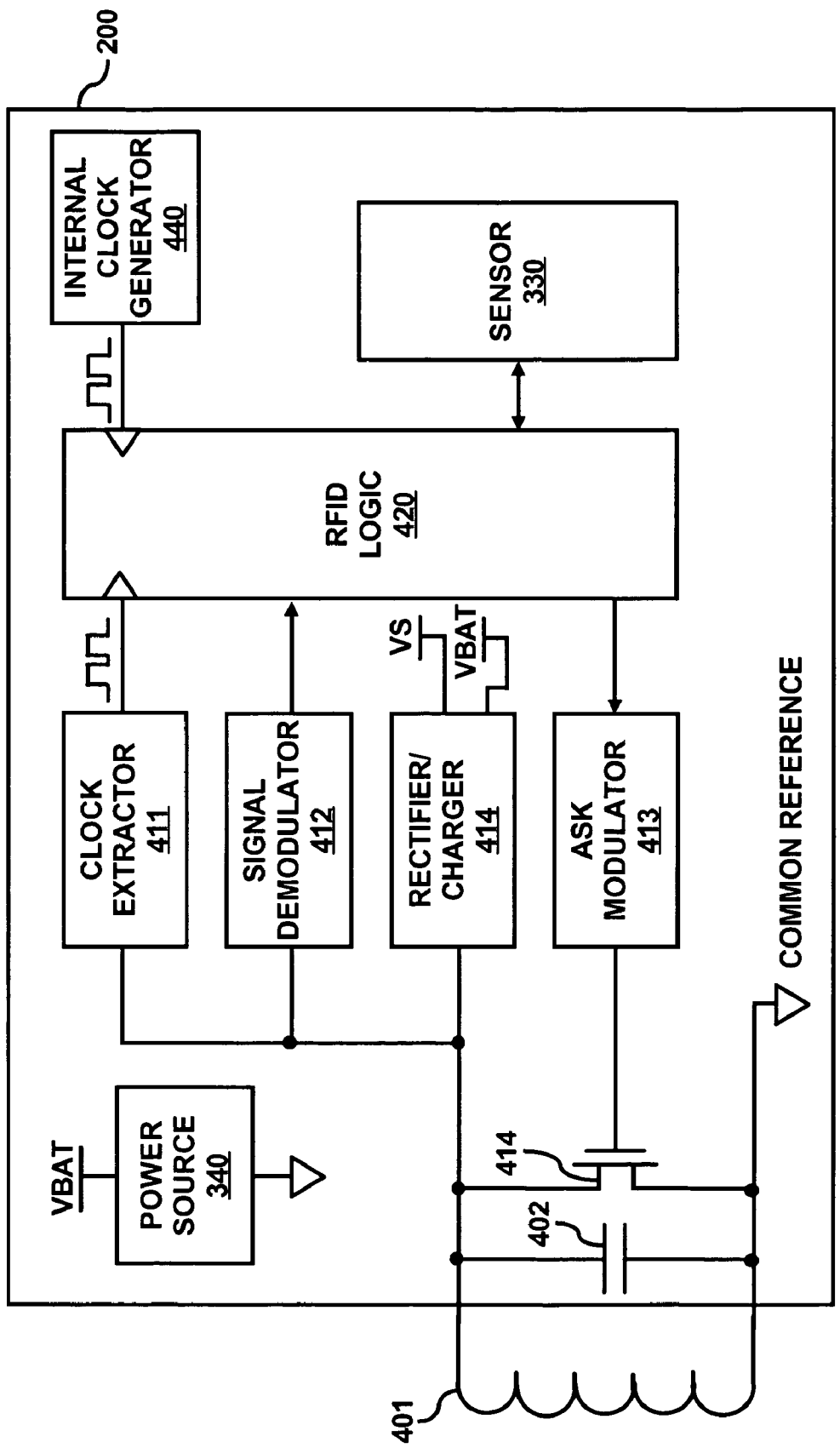

FIG. 4B illustrates a circuit diagram of an embodiment of an active or semi-active tag circuit, including a power source, which may be used in the embodiment of the RFID assembly 200 described with respect to FIG. 3B. Semi-active may include a RFID assembly that is turned on, for example, in response to receiving a signal, and then turns off after performing one or more functions such that less power is consumed.

The power source 340 may include a rechargeable battery or a super capacitor. Reader-to-tag communications are performed as described above with respect to FIG. 4A, where the RFID assembly 200 uses an external RF field for external communications. The rectifier circuit 414 is modified to provide a means to also provide a charge to the power source 340 if a rechargeable power source is used when the RFID assembly 200 is being energized by an external RF field. This local source of power provides the RFID logic 420 the capability to operate in the absence of an external field. This is achieved by passing the stored charge from the power source 340 back to VS to power the RFID logic 420 and the sensor 330. As the RFID assembly 200 extracts its clock signal from the RF field, an alternate clock is internally generated by the clock generator 440 to drive the RFID logic 420 in the absence of the RF field. This clock may be generated at a different frequency to the RF field derived clock, such as at a much lower frequency to conserve power. By introducing an internal power source 340, the RFID assembly 200 has the capability to perform sensing functions in isolation. For example, the sensor 330 can be monitored for sensed data or activated on a periodic basis or in response to external events, such as temperatures that exceed a pre-determined range. The internal clock also provides the ability to time-stamp such events so that the RFID logic 420 can record the time at which certain events or anomalies occur. However, in one example, the data is retrieved when the RFID assembly 200 is again energized by an external reader's RF field. Continued operation of the RFID assembly 200 is feasible as long as the reader 310 is active for a long enough time slot to charge the sensing units in its vicinity. To minimize overall power consumption, non-essential sections of the RFID logic 420 and the sensor 330 may be switched off or placed into sleep states during periods of inactivity. For example, when performing periodic measurements, the sensor 330 is de-powered during the inactive periods in between each measurement. Also, in another example, the RFID logic circuit 420 used to generate the CRC may only be active while a message is being sent to the reader 310 to conserve power. The RFID logic 420 within an active or semi-active RFID assembly 200 may be implemented as an FSM. The presence of a continuous power and clock sources would also allow a small embedded micro-processor engine to be considered to replace the FSM with a more flexible and re-programmable computation engine.

Figure 5:
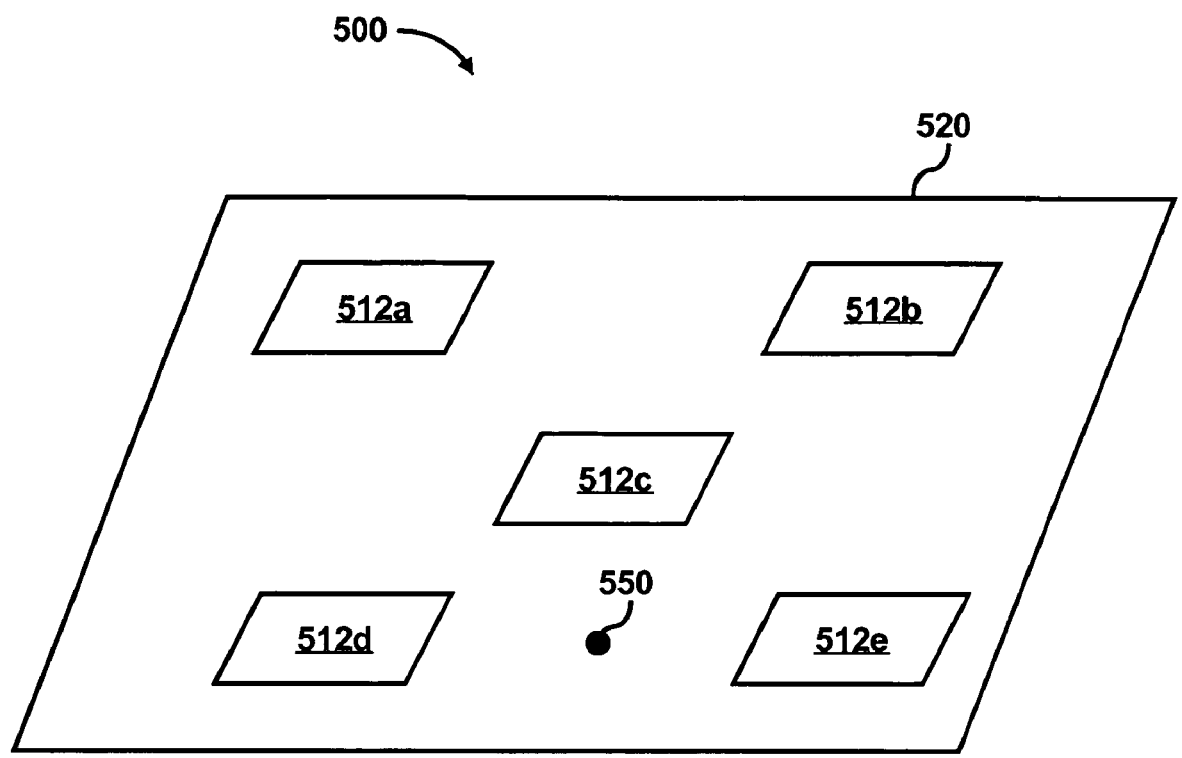
FIG. 5 illustrates an example of an environment including a sensor network.

FIG. 5 illustrates an example of an environment 300 including a sensor network. A surface 520 in the environment includes an array of RFID assemblies 512a-512e. The RFID assemblies 512a-512e may include unique ID codes. A processing system (not shown) may determine and/or store the location of each of the RFID assemblies 512a-512e. When information regarding the environment is needed, a reader, such as the reader 310 shown in FIGS. 3A-C, may be configured to address specific RFID assemblies 512a-512e from which to obtain sensed information.

For example, the reader 310 may be configured to obtain information regarding a location 550, such as the attributes described with regard to FIG. 3A. The reader may be configured to obtain information from the two closer RFID assemblies 512d, 512e, from the three closer RFID assemblies 512c-512e or from all of the RFID assemblies 512a-512e.

The information obtained from the RFID assemblies 512a-512e may include physical information (mechanical, optical, etc), chemical information, and the like. The physical information may include a vibration or other change in the physical attributes of the environment, such as, some type of a breach in the environment. The chemical information may include a swelling of a polymer, as described above with respect of FIG. 2. The sensed chemical information may be used to detect leaks; for example, the sensed information may be used to detect if a leak occurred in a fuel tank. The optical information may include a change in the way light reflects of various surfaces or an increase or decrease in light. If the sensor network includes a light/infrared ("IR") sensor network, the sensed information may be used to detect position of a craft with respect to its surroundings. For example, the sensed information may be used to detect position of a vehicle with regard to the Sun or other light source. In one embodiment, the sensed event may be converted (or transduced) to an electrical signal to be read by the reader 310.

The RF signal transmitted by the reader 310 may also be encoded to program the sensors 230 of the RFID assemblies 512c-512e. The sensors may be programmed to change what the sensor is sensing, the sensitivity with which it senses, and the amount of power the sensor uses or the dynamic range over which the sensor senses. For example, the RF signal may be used to program one or more of the sensors to have higher sensitivity. An example of higher sensitivity may include a temperature sensor that reports a change in temperature every 0.1 degrees rather than every 1 degree.

The RF signal transmitted by the reader 310 may also be used to recharge batteries that power the sensors of the RFID assemblies 512a-512e. In another embodiment, the RF signal may be used to power the sensors of the RFID assemblies 512a-512e without batteries.

Figure 6:
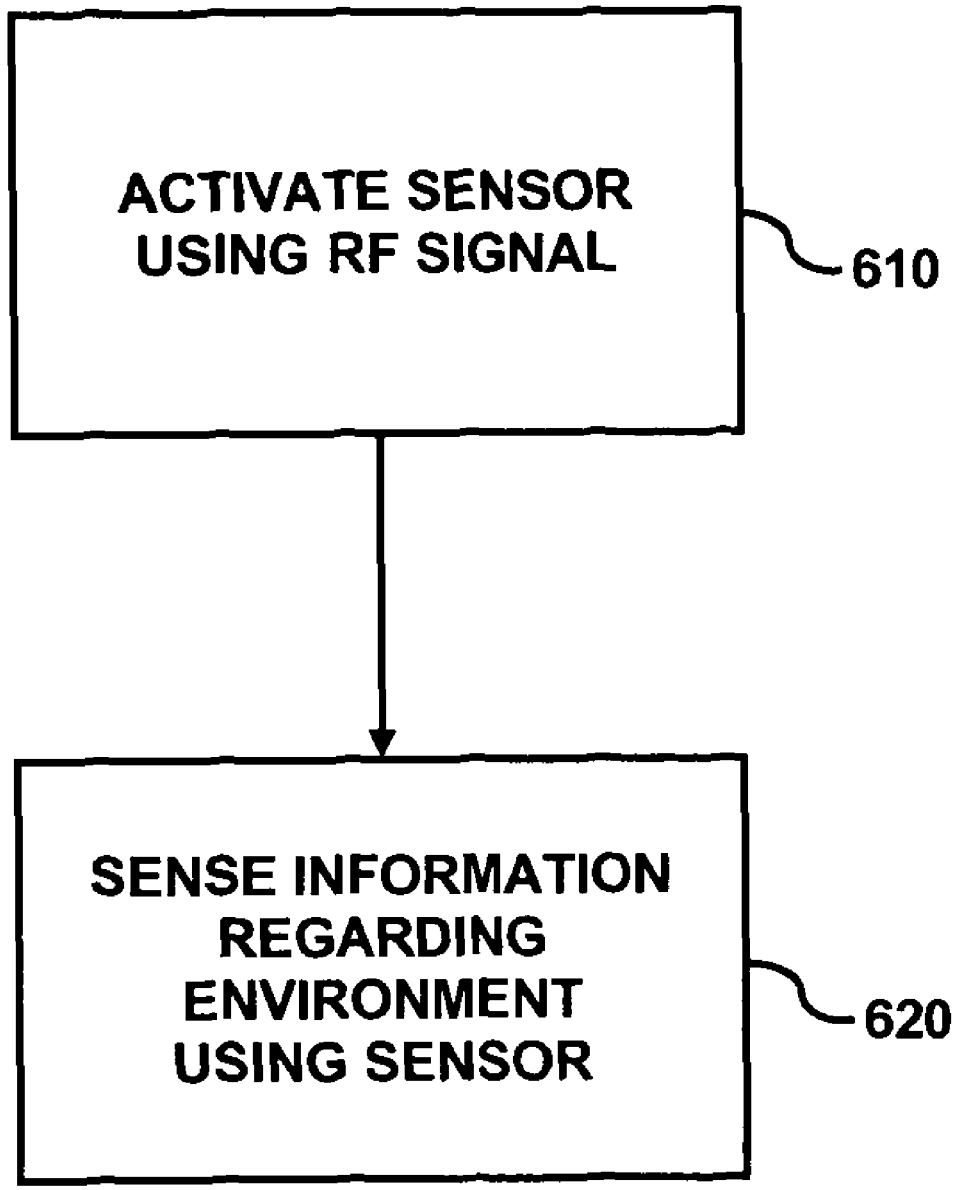
FIG. 6 illustrates an example of a method of monitoring an environment.

FIG. 6 illustrates an example of a method 600 of monitoring an environment. Although reference may be made to FIGS. 1, 2, 3A-3C, 4A-4B and 5, it will be understood that the elements shown in these figures are not necessary for the performance of the method described. As such, references to FIGS. 1, 2, 3A-3C, 4A-4B and 5 are for illustrative purposes and are not meant to limit the method 500 to features illustrated in those figures.

At step 610, the sensing unit 330 is activated by the RF signal 315 shown in FIGS. 3B-C. In one embodiment, a reader, such as the reader 310 shown in FIG. 3A-C, provides the RF signal. At step 620, information regarding an environment is sensed through the sensing unit 230. The sensing unit 230 may be a part of a RFID assembly, such as the RFID assemblies 200, 412a-412e shown in FIGS. 2, 3A-3C, 4A-B and 5. The environment may include any type of environment which it is desired to monitor. For instance, the environment may include a surface, such as, a vehicle skin, or a multi-dimensional space, such as, a field or the interior of a building or container, wearable vest, etc. In addition, the RFID assemblies may be positioned in any reasonably suitable manner. For instance, the RFID assemblies may be manually positioned at specific areas, the RFID assemblies may be sprayed into the environment in which they are designed to monitor, etc.

In one embodiment, activating the sensing unit 230 may include powering the sensing unit through the RF signal 315. In some instances, the sensor 330 may receive all of the power needed to operate from the RF signal 315. In another embodiment, the power source 340 shown in FIG. 3B associated with the sensor 330 may be recharged by the RF signal 315. In another embodiment, activating the sensing unit 230 may include turning on the sensor 330 of the sensing unit 230.

The method 600 may further include turning the sensing unit 230 off using the RF signal. Turning the sensing unit 230 off may include generally turning off all sensing units of the sensor network 350 or turning off specific sensing units by encoding unique IDs of RFID tags associated with the specific sensing units in the RF signal.

The method 600 may also include programming the sensing unit 230 using the RF signal 315. For example, the RF signal 315 may be encoded to include instructions for the sensor 330 of the sensing unit 230 to increase sensitivity of the sensor.

In addition to or in place of the sensing unit 230 being turned on by the reader 310, the RFID assemblies may continuously sense information regarding the environment from the plurality of RFID assemblies to monitor the environment and periodically transmit this information. In this embodiment, the sensing units may also be powered by another low power source, such as a RFID reader or a battery. For example, the RFID assemblies may be powered by an ultra-low power thin film battery.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. An assembly for monitoring an environment, the assembly comprising:
    a radio frequency identification ("RFID") tag; and
    a sensing unit configured to be activated by a radio frequency ("RF") signal received by the RFID tag and sense information regarding an environment, wherein the sensing unit is further configured to be programmed by the RF signal.

2. The assembly of claim 1, wherein the sensing unit is a specified sensing unit that is part of a sensor network, the specified sensing unit further configured to be activated in response to the RFID tag receiving a unique ID encoded in the RF signal wherein the unique ID is associated with the specified sensing unit.

3. The assembly of claim 1, wherein the sensing unit comprises a sensor and a battery, and wherein the sensing unit being configured to be activated by the RF signal includes the battery being configured to be recharged by the RF signal.

4. The assembly of claim 1, wherein the sensing unit comprises a sensor, wherein the sensing unit being configured to be activated by the RF signal includes the sensor being configured to be powered by the RF signal.

5. The assembly of claim 1, wherein the sensing unit comprises a sensor, wherein the sensing unit being configured to be activated by the RF signal includes the sensor being configured to be turned on by the RF signal.

6. A method of monitoring an environment, the method comprising:
    activating a sensing unit using a RF signal;
    programming the sensing unit using the RF signal; and
    sensing information regarding an event in an environment through the sensing unit.

7. The method of claim 6, wherein sensing information regarding the environment comprises:
    sensing information regarding a change in the environment.

8. The method of claim 6, wherein sensing information regarding the environment comprises:
    sensing attributes regarding the environment.

9. The method of claim 6, wherein activating the sensing unit using the RF signal comprises powering the sensor using the RF signal.

10. The method of claim 6, wherein activating the sensing unit using the RF signal comprises turning the sensing unit on.

11. The method of claim 6, further comprising turning off the sensing unit using the RF signal.

12. The method of claim 6, wherein activating the sensing unit using the RF signal comprises activating the sensing unit using a radio frequency identification ("RFID") reader.

13. The method of claim 12, further comprising reading the sensed information using the RFID reader.

14. The method of claim 13, wherein the sensing unit is included in a plurality of sensing units forming a sensor network, and reading the sensed information further comprises:
    transmitting a unique ID of the sensing unit to the sensing unit from the reader; and
    receiving the sensed information from the sensing unit at the reader.

15. The method of claim 13, wherein the sensing unit is included in a plurality of sensing units forming a sensor network, and reading the sensed information further comprises:
    transmitting unique IDs of multiple sensing units in the sensor network, to the plurality of sensors assembly from the reader; and
    receiving sensed information from the multiple sensing units at the reader.

16. The method of claim 6, wherein the sensing unit comprises at least one sensor and RFID circuitry.

17. The method of claim 6, wherein activating the sensing unit comprises activating a specific sensing unit of two or more sensing units in response to receiving an address of the specific sensing unit in the RF signal.

18. The method of claim 6, further comprising:
    comparing a received address of a specified sensing unit to a stored identification; and
    activating the specified sensing unit if the received address matches the stored identification.

19. The method of claim 6, wherein activating the sensing unit comprises activating two or more specific sensing units of three or more sensing units in response to receiving addresses of the two or more specific sensing units in the RF signal.

20. A system for monitoring an environment, the system comprising:
    means for sensing information regarding an event in an environment;
    means for activating the means for sensing using a radio frequency ("RF") signal; and
    means for programming the means for sensing using the RF signal.

* * * * *